(12) United States Patent
Forsberg

(10) Patent No.: US 7,536,151 B2
(45) Date of Patent: May 19, 2009

(54) METHODS, SYSTEMS, DEVICES AND COMPUTER PROGRAM PRODUCTS FOR PROVIDING USER-ACCESS TO BROADCAST CONTENT IN COMBINATION WITH SHORT-RANGE COMMUNICATION CONTENT

(75) Inventor: Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 409 days.

(21) Appl. No.: 10/979,652

(22) Filed: Nov. 1, 2004

(65) Prior Publication Data

US 2006/0103507 A1 May 18, 2006

(51) Int. Cl.
*H04B 7/00* (2006.01)

(52) U.S. Cl. .................. 455/41.2; 455/3.01; 455/3.03; 348/432; 370/432; 340/5.1

(58) Field of Classification Search ............... 455/41.2, 455/3.04, 3.01, 3.03; 348/734, 563; 375/316; 370/432; 340/5.1
See application file for complete search history.

(56) References Cited

U.S. PATENT DOCUMENTS

| | | | | |
|---|---|---|---|---|
| 5,123,046 A * | 6/1992 | Levine | ............ | 380/242 |
| 5,297,204 A * | 3/1994 | Levine | ............ | 380/242 |
| 5,481,294 A * | 1/1996 | Thomas et al. | ............ | 725/20 |
| 5,942,987 A * | 8/1999 | Heinrich et al. | ............ | 340/10.42 |
| 5,982,363 A * | 11/1999 | Naiff | ............ | 715/721 |
| 6,144,998 A * | 11/2000 | Pisterzi | ............ | 725/109 |
| 6,184,918 B1 * | 2/2001 | Goldschmidt Iki et al. | .... | 725/20 |
| 6,219,042 B1 * | 4/2001 | Anderson et al. | ............ | 715/716 |
| 6,467,089 B1 * | 10/2002 | Aust et al. | ............ | 725/13 |
| 6,614,470 B1 * | 9/2003 | Manowitz et al. | ............ | 348/211.2 |
| 6,628,729 B1 * | 9/2003 | Sorensen | ............ | 375/316 |
| 6,665,017 B1 * | 12/2003 | Raiyat | ............ | 348/468 |
| 6,717,507 B1 * | 4/2004 | Bayley et al. | ............ | 340/5.1 |
| 6,748,427 B2 * | 6/2004 | Drosset et al. | ............ | 709/219 |
| 6,765,474 B2 * | 7/2004 | Eaton et al. | ............ | 340/7.43 |
| 6,802,078 B2 * | 10/2004 | Tachikawa | ............ | 725/110 |
| 6,850,285 B2 * | 2/2005 | Eaton et al. | ............ | 348/563 |
| 6,944,621 B1 * | 9/2005 | Collart | ............ | 707/102 |
| 6,950,646 B2 * | 9/2005 | Pradhan et al. | ............ | 455/406 |

(Continued)

FOREIGN PATENT DOCUMENTS

CA 2469377 A1 11/2005

(Continued)

*Primary Examiner*—Matthew D Anderson
*Assistant Examiner*—April S Guzman
(74) *Attorney, Agent, or Firm*—Alston & Bird, LLP

(57) ABSTRACT

Systems, devices and methods for providing user access to broadcast content in combination with user access to short-range communication content, such as RFID tag content or the like. A broadcast medium, such as Radio Data Broadcast, that provides for broadcast frequency transmission in unison with other content being carried on alternative frequencies is used to transmit digital broadcast signals that include both broadcast content and short-range communication content. A digital broadcast receiver that is equipped to receive the digital signals will additionally include a short-range communication transponder, such as an RFID tag or the like. The transponder, i.e., tag, will include dynamic updateable memory, such that as digital signals are received with new short-range communication content the information associated with the tag will be updated. The tag allows a reader device to capture and, in many instances, store the tag information for later use.

53 Claims, 5 Drawing Sheets

U.S. PATENT DOCUMENTS

| | | | |
|---|---|---|---|
| 6,952,595 B2 * | 10/2005 | Ikedo et al. | 455/553.1 |
| 6,970,518 B2 * | 11/2005 | Kuffner et al. | 375/259 |
| 6,975,835 B1 * | 12/2005 | Lake et al. | 455/3.01 |
| 6,983,124 B1 * | 1/2006 | Bayley et al. | 455/41.2 |
| 7,023,817 B2 * | 4/2006 | Kuffner et al. | 370/324 |
| 7,058,397 B2 * | 6/2006 | Ritter | 455/419 |
| 7,140,011 B2 * | 11/2006 | Hallford | 717/165 |
| 7,218,641 B2 * | 5/2007 | Kuffner et al. | 370/445 |
| 7,274,909 B2 * | 9/2007 | Perttila et al. | 455/41.2 |
| 2001/0025376 A1 * | 9/2001 | Knobl | 725/74 |
| 2001/0055341 A1 * | 12/2001 | Herrmann et al. | 375/240.25 |
| 2002/0056112 A1 * | 5/2002 | Dureau et al. | 725/78 |
| 2002/0140855 A1 * | 10/2002 | Hayes et al. | 348/465 |
| 2003/0005463 A1 * | 1/2003 | Macrae et al. | 725/112 |
| 2003/0106072 A1 * | 6/2003 | Soundararajan | 725/151 |
| 2003/0191851 A1 * | 10/2003 | Edwards | 709/231 |
| 2004/0040037 A1 * | 2/2004 | Kim | 725/40 |
| 2004/0103439 A1 * | 5/2004 | Macrae et al. | 725/109 |
| 2004/0205191 A1 * | 10/2004 | Smith et al. | 709/227 |
| 2005/0047426 A1 * | 3/2005 | Aaltonen et al. | 370/432 |
| 2005/0075170 A1 * | 4/2005 | Garcia Alonso et al. | 463/42 |
| 2005/0208913 A1 * | 9/2005 | Raisinghani et al. | 455/161.2 |
| 2005/0272437 A1 * | 12/2005 | Ritter et al. | 455/452.2 |
| 2005/0275758 A1 * | 12/2005 | McEvilly et al. | 348/725 |
| 2006/0206582 A1 * | 9/2006 | Finn | 709/217 |
| 2007/0006275 A1 * | 1/2007 | Wright et al. | 725/133 |
| 2007/0019110 A1 * | 1/2007 | Cho | 348/554 |

FOREIGN PATENT DOCUMENTS

| | | | |
|---|---|---|---|
| EP | 1022704 A1 | | 7/2000 |
| EP | 1213842 A1 | * | 6/2002 |
| EP | 1253541 A2 | | 10/2002 |
| WO | WO 98/17064 | | 4/1998 |
| WO | WO 03/032500 A2 | | 4/2003 |
| WO | WO 2004088983 A2 | * | 10/2004 |

* cited by examiner

METHODS, SYSTEMS, DEVICES AND COMPUTER PROGRAM PRODUCTS FOR PROVIDING USER-ACCESS TO BROADCAST CONTENT IN COMBINATION WITH SHORT-RANGE COMMUNICATION CONTENT

FIELD OF THE INVENTION

The present invention relates to short-range communication transponders (i.e., tags) and, more specifically to methods, devices, systems and computer program that provide short-range communication content, such as RFID (Radio Frequency Identification) content and the like in combination with broadcast content, such that a programmable tag integrated with a broadcast receiver apparatus can provide short-range communication access to the short-range communication content.

BACKGROUND OF THE INVENTION

Short-range wireless communication capability is becoming more prominent in a wide variety of mobile digital devices, such as cellular phones, personal digital assistants, pagers and other mobile devices. By equipping such devices with requisite short-range communication readers the devices have the ability to communicate via RFID (Radio Frequency Identification), Bluetooth, Infrared (IR), Wireless Local Area Network (WLAN) or other types of short-range communication dependent upon the type of reader/transceiver associated with the mobile device. Devices equipped with such readers are capable of receiving information from transponders, also referred as tags. As more and more portable digital devices become equipped with short-range wireless communication means, such as RFID and the like, the device's ability to access information and services expands.

Short-range communication tags are typically simplistic in design; including an integrated circuit that incorporates the associated short-range communication circuitry and sufficient memory to store the information that will be communicated to the transponder. While conventional tags, such as those embodied in a card or key fob format, include memory which is read-only and permanent in nature, future tags may be configured with dynamic updateable memory that allows for the content of the tag to be frequently updated or revised.

As previously noted, short-range communication, such as RFID and the like, provides users the unique advantage of accessing additional information about a product, service or the like. For example, if a tag is attached to merchandise at a retail store and a shopper is equipped with a tag reader, the shopper may read the tag and be provided with additional information about the product, such as specification, consumer reports, pricing information and the like. If the reading device has adequate storage capacity, the user can store the information for future purposes. As such, short-range communication provides the capability to provide users with a limitless amount of information.

One service that up to now has not benefited from exchange of additional information via short-range communication is broadcast services, such as radio broadcasts and television broadcasts. While, Radio Data System (RDS) has recently become a commercially viable means of transmitting broadcast content, such as television and radio signals, along with other types of informational content, RDS is limited to providing the additional information in conventional formats, such as by display of the information or audio transmissions of the information. RDS does not provide a means whereby the additional information may be readily captured and, possibly, stored by the user.

RDS is made possible by transmitting the informational content on alternative frequencies. For example, automobiles equipped with RDS receivers are able to receive RDS broadcast signals and, in addition to being provided the audio signal, are provided information about the program (i.e., program title, song title, artist and the like), which is displayed on an associated alpha-numeric display. The ability to provide both the broadcast and the information content, seemingly simultaneously, is made possible by PLL (Phase Locked Loop) tuner technology that permits a broadcast receiver to be retuned within milliseconds. During this re-tune process the audio or visual signal is muted, which because of the short time is usually not detected by the eyes or ears. Thus, the broadcast receiver is able to choose the transmitter frequency, among a number of alternatives, thus providing the best quality reception and the informational content. In addition to program service information the additional information may include but is not limited to, travel/traffic information, weather information, time/calendar information and the like.

Thus a need exists to develop systems, devices and corresponding methods and computer programs for providing broadcast content in combination with other informational content. The desired system should benefit from the user being able to capture and store the information without having to remember the information or otherwise provide inputs (keystrokes and the like) to the capturing device. The desired system should provide for systems, devices, etc. that allow for a user to capture and store information quickly and efficiently, while listening to or viewing broadcast content. In addition the desired systems and devices may provide for user to capture and store only the information that user has previously designated as being user-preferred information.

BRIEF SUMMARY OF THE INVENTION

The present invention provides for methods, systems, devices and computer programs for providing user access to broadcast content in combination with user access to short-range communication content, such as RFID tag content or the like. A broadcast medium, such as Radio Data Broadcast, that provides for broadcast frequency transmission in unison with other content being carried on alternative frequencies is used to transmit digital broadcast signals that include both broadcast content and short-range communication content. A digital broadcast receiver that is equipped to receive the digital signals will additionally include a short-range communication transponder, such as an RFID tag or the like. The transponder, i.e., tag, will include dynamic updateable memory, such that as digital signals are received with new short-range communication content the information associated with the tag will be updated. The tag allows a reader device to capture and, in many instances, store the tag information for later use. Thus the invention allows the user of the reader device the ability to efficiently capture and store information without having to remember a URL (Universal resource Locator), a Short Message Service (SMS) message or the like. In addition, short-range communication provides for the user of the reading device to capture and store information without having to provide inputs, keypad entries or the like, to the capturing device.

In one embodiment of the invention an apparatus is defined for receiving digitally broadcasted signals. The apparatus includes a digital broadcast receiver that receives a broadcasted digital signal, detector logic for detecting short-range communication content in the received broadcasted digital signal and a short-range communication tag in communication with the processor that is associated with updateable memory, wherein the detected short-range communication content is stored in the updateable memory. The apparatus will typically be an appliance such as a television, a radio, a set-top box or the like. In one specific embodiment the apparatus may be an automobile radio. The short range communication may include Radio Frequency Identification (RFID) communication, Infrared (IR) communication, Wireless Local Area Network (WLAN) communication, Bluetooth® (i.e., communication in the about 2.4 GHz frequency band) and the like.

The logic elements of the apparatus may be embodied in hardware or software. In the instance in which a logic element is embodied in a distinct or combined logic device, the device will typically be in communication with a processing unit. In the instance in which the logic element is embodied in software, i.e., computer program instructions or routine, the software will typically be stored in associated memory and implemented by a processing unit.

The apparatus may further include logic for processing logic for converting the detected short-range communication content in the received broadcasted digital signal into data suitable for short-range communication. In addition, the apparatus may further include inserter logic for inserting the detected short-range communication content into the updateable memory associated with the short-range communication tag.

In some applications, the short-range communication content in the broadcast signal may be exceed in volume the storage capacity of the updateable memory associated with the short-range communication tag. In such embodiments the apparatus may further include parser logic that parses the detected short-range communication content into two or more portions suitable for insertion in the updateable memory. In those applications in which the short-range communication is parsed, the apparatus may be configured to include a buffer memory that temporarily stores one or more of the parsed portions prior to storage in the updateable memory. In addition buffer memory may be used when the short-range communication content in the broadcast signals is changing at a rate that exceeds the update rate of the programmable tag memory.

In another embodiment of the invention a system is defined for providing broadcast content in combination with short-range communication content. The system includes a broadcasting means for broadcasting digital signals that include broadcast content and short-range communication content and a digital receiver apparatus that receives the broadcasted digital signals. The digital receiver apparatus includes a short-range communication tag having updateable memory that stores the short-range communication content. The system will also include a short-range communication reader apparatus capable of reading the short-range communication content from the tag when the reader is within a predefined range of the digital receiver apparatus.

The broadcast means will typically be further defined as audio broadcasting means, for example radio signal transmission means or video broadcasting means, for example television signal transmission means.

As previously noted in the apparatus embodiment, the digital receiver device may further include detector logic for detecting the short-range communication content in the received digital signals, processing logic for converting the received short-range communication content to data suitable for short-range communication, parsing logic for parsing the short-range communication content into two or more portions or insertion logic for inserting the short-range communication content into the updateable memory of the short-range communication tag. The receiver apparatus may also include a buffer memory for temporarily storing the short-range communication content prior to storage in the dynamic memory.

The reader apparatus will typically be a portable apparatus, such as a cellular telephone, a personal data assistant (PDA), a laptop or handheld computer, a remote control device or the like. The reader may additionally include logic that provides for the user of the device to predetermine which type of content the user desires capturing. In this regard the user is able to customize the content that is delivered to the reader device.

The invention is additionally embodied in a short-range communication tag device. The device includes a broadcast receiver interface in communication with a broadcast receiver that receives short-range communication content from the receiver, a processing unit in communication with the broadcast receiver interface, an updateable memory unit in communication with the processing unit that stores short-range communication content that is updated in relation to associated broadcast content and a wireless short-range communication interface in communication with the processing unit that provides for transmission of the stored short-range communication content. In one embodiment the short-range communication tag will be further defined as a passive Radio Frequency Identification (RFID) tag. The passive tag does not consume power and, therefore saves a considerable amount of energy for the broadcast receiver.

The invention is also embodied in a method for providing short-range communication content in combination with broadcast content. The method includes the steps of broadcasting a digital signal that includes broadcast content and short-range communication content, receiving the signal at a broadcast receiver apparatus equipped with an integrated programmable short-range communication tag, providing the short-range communication content to an updateable memory unit associated with the programmable short-range communication tag and reading the short-range communication via a reader apparatus that is proximate the broadcast receiver apparatus. The short range communication may be Radio Frequency Identification (RFID) communication, Infrared (IR) communication, Wireless Local Area Network (WLAN), Bluetooth® communication (i.e., communication in the about 2.4 GHz frequency band) or the like.

The method may further comprise the step of detecting the short-range communication content of the received digital signal upon receipt of the signal at the broadcast receiver. Alternatively, the method may include the step of converting or reformatting the short-range communication content of the received digital signal to data suitable for short-range communication. Additionally, the method may include the step of inserting the detected short-range communication content into the dynamic memory unit associated with the programmable short-range communication tag.

In those embodiment in which the short-range communication content exceeds in volume the capacity of the updateable memory, the method may include the step of parsing the short-range communication content of the received digital signal into two or more portions and the step of inserting one or more of the portions into a temporary buffer memory unit prior providing the one or more portions to the dynamic memory unit associated with the programmable short-range communication tag.

The short-range communication content will typically be related to the broadcast content. For example, if the broadcast content is a radio program that includes music, the short-range communication content may provide for additional information related to the music or if the broadcast content is a commercial for a product or service the short-range communication content may provide for additional information related to the product or service.

An alternate method for providing a user access to short-range communication content in combination with access to broadcast content further defines the invention. The method includes the step of receiving a broadcasted digital signal that includes broadcast content and short-range communication content, detecting the short-range communication content in the broadcasted digital signal, inserting the short-range communication content into dynamic memory associated with a short-range communication tag and providing the broadcast content in user-perceptible format. The short-range communication content will typically be associated with the broadcast content, such that when the broadcast content is provided to the user in user-perceptible form (i.e., audio or visual format), the short-range communication content will provide additional information related to the broadcast content.

Additionally, the method may provide for the step of converting the short-range communication content into data suitable for short-range communication. If the volume of the short-range communication content exceeds the capacity of the updateable memory, the method may include the step of parsing the short-range communication content of the received digital signal into two or more portions and the step of inserting one or more of the portions into a temporary buffer memory unit prior to providing the one or more portions to the updateable memory.

The invention may also be embodied in a computer program product for providing user access to short-range communication content in combination with access to broadcast content. The computer program product comprising a computer-readable storage medium having computer-readable program code portions stored therein. The computer-readable program code portions include a first executable portion capable of detecting short-range communication content in a digital broadcast signal and a second executable portion capable of inserting the short-range communication content into updateable memory that is associated with a short-range communication tag. The computer program product may further include a third executable portion for converting the short-range communication content into data suitable for short-range communication prior to inserting the short-range communication content into the dynamic memory. The computer program product may further include a third executable portion for parsing the short-range communication content into two or more portions and a fourth executable portion for inserting one or more of the portions into a temporary storage buffer prior to inserting the one or more portions into the dynamic memory.

Thus, the present invention provides systems, devices and methods for providing user access to broadcast content in combination with user access to short-range communication content, such as RFID tag content or the like. Thus the invention allows the user of the reader device the ability to efficiently capture and store information without having to remember a URL (Universal resource Locator), a Short Message Service (SMS) message or the like. In addition, short-range communication provides for the user of the reading device to capture and store information without having to provide inputs, keypad entries or the like, to the capturing device.

BRIEF DESCRIPTION OF THE DRAWINGS

Figure 1:
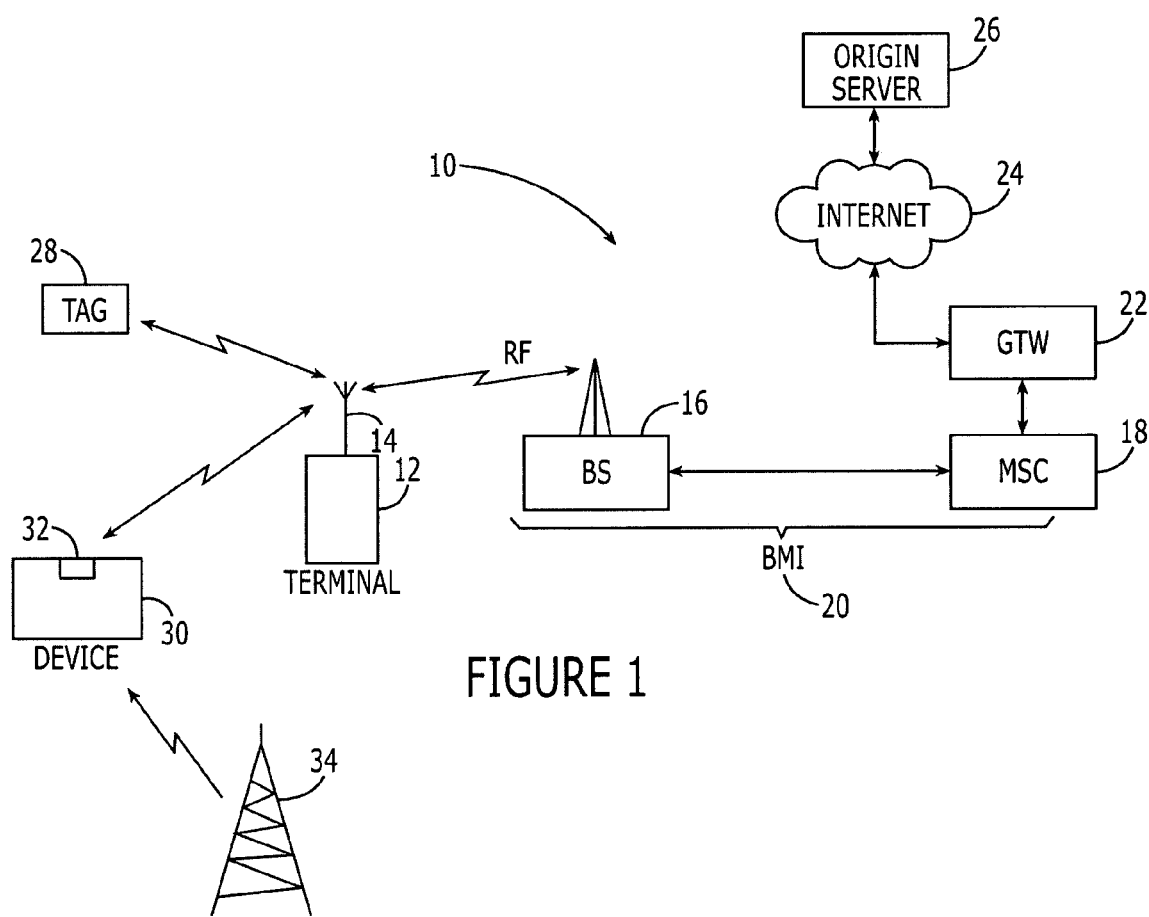

Having thus described the invention in general terms, reference will now be made to the accompanying drawings, which are not necessarily drawn to scale, and wherein:

FIG. 1 is a block diagram of a system for broadcast communication short-range wireless communication and wireless cellular network communication, in accordance with an embodiment of the present invention.

Figure 2:
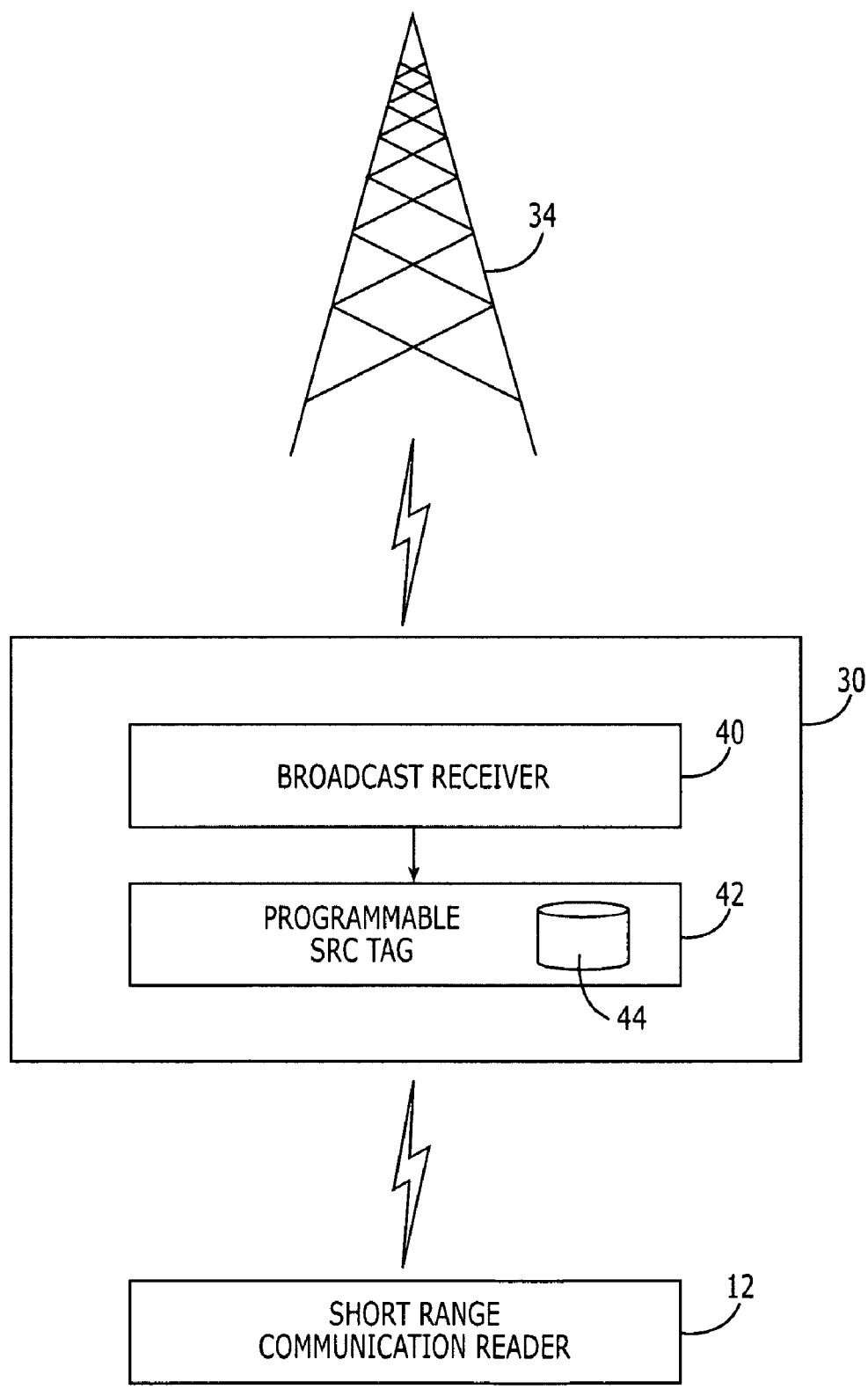

FIG. 2 is a simplified block diagram of a system for providing broadcast content in combination with providing access to short-range communication content, in accordance with an embodiment of the present invention.

Figure 3:
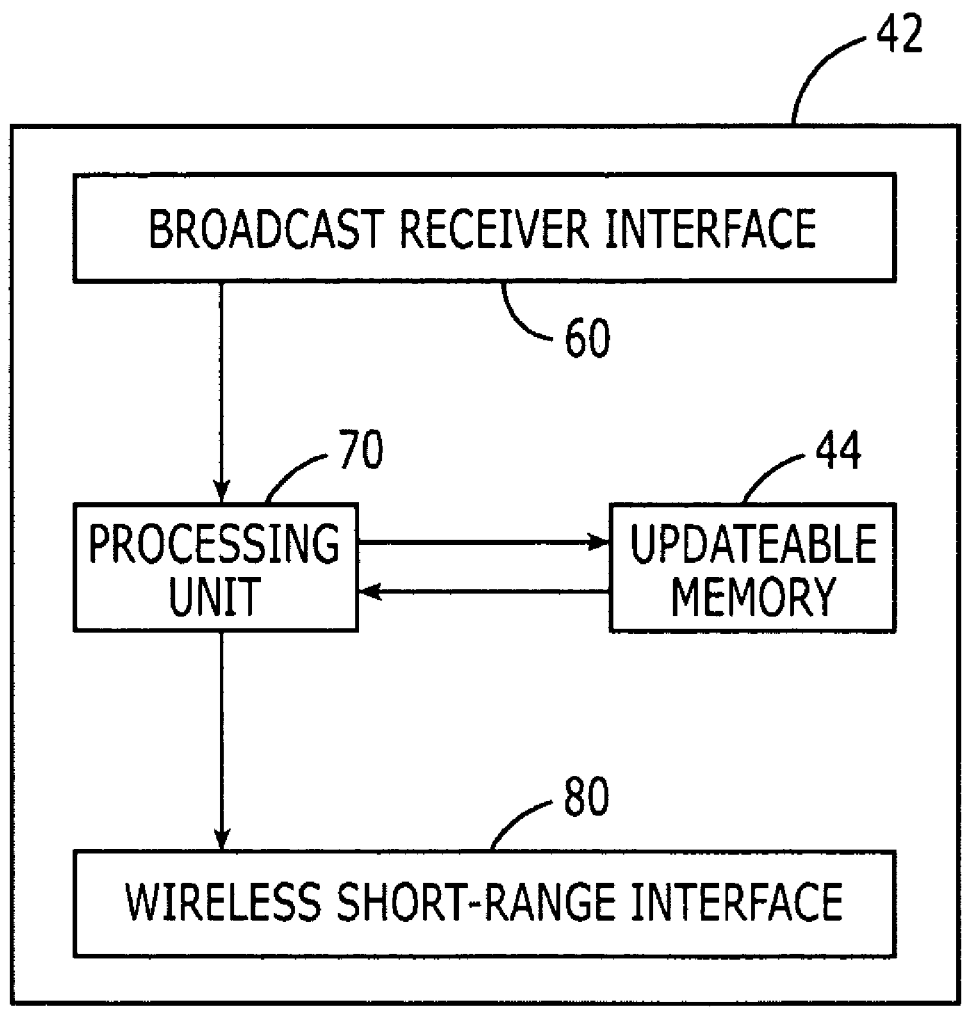

FIG. 3 is a simplified block diagram of a programmable short-range communication tag, in accordance with an embodiment of the present invention.

Figure 4:
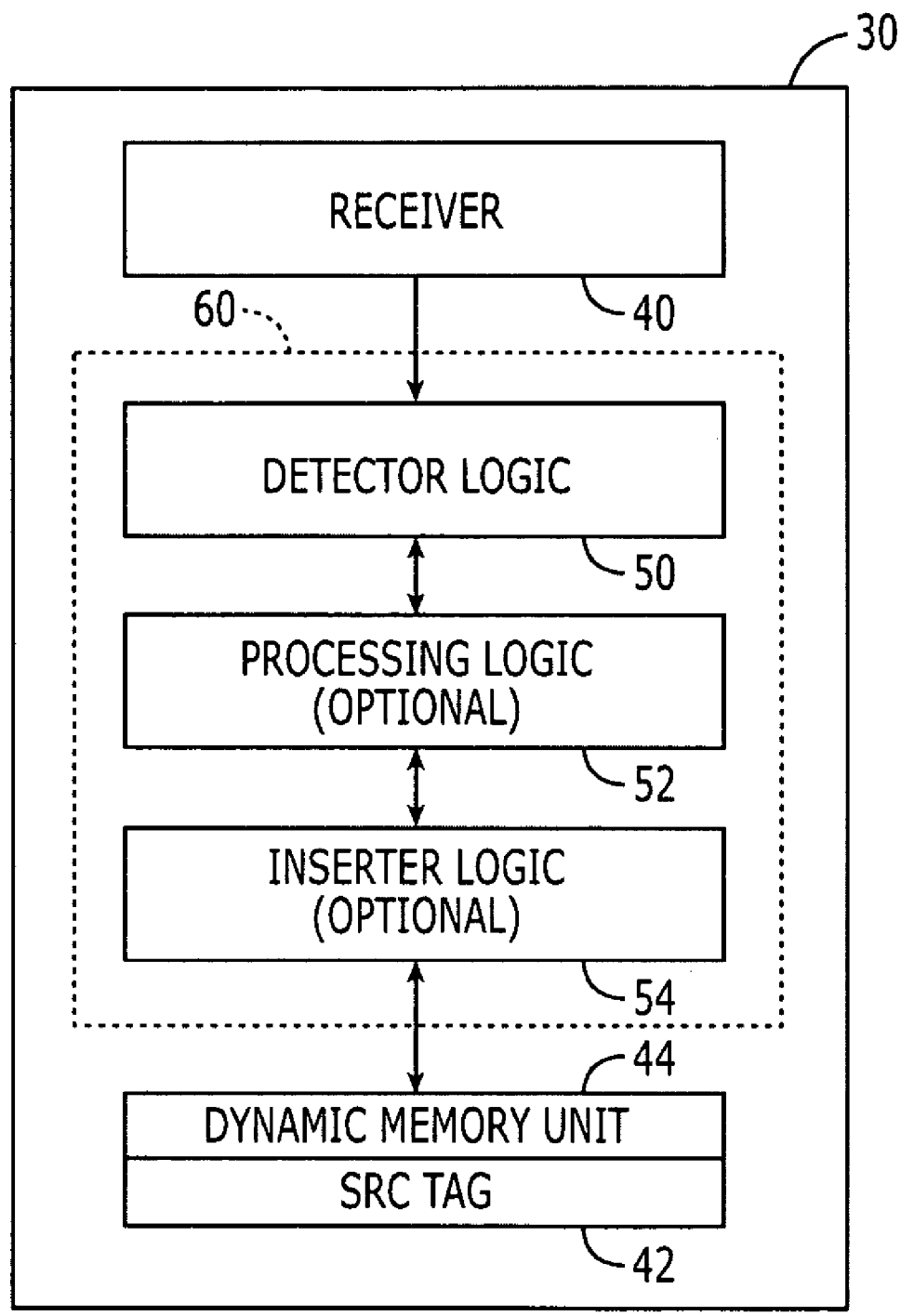

FIG. 4 is a block diagram of an apparatus that provided reception of broadcast signals and provides for access to short-range communication content, in accordance with an embodiment of the present invention.

Figure 5:
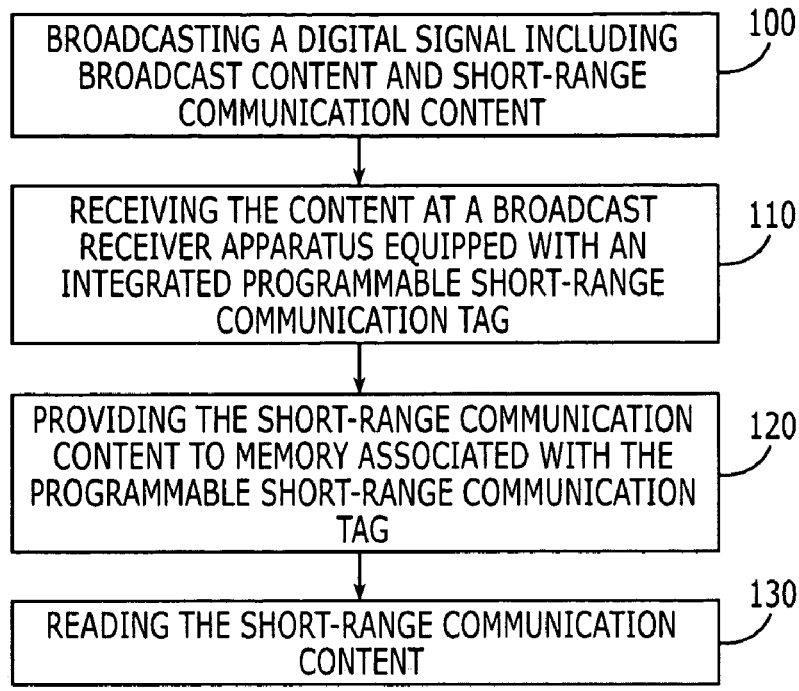

FIG. 5 is a flow diagram of a method for providing a user access to short-range communication content in combination with access to broadcast content, in accordance with an embodiment of the present invention.

Figure 6:
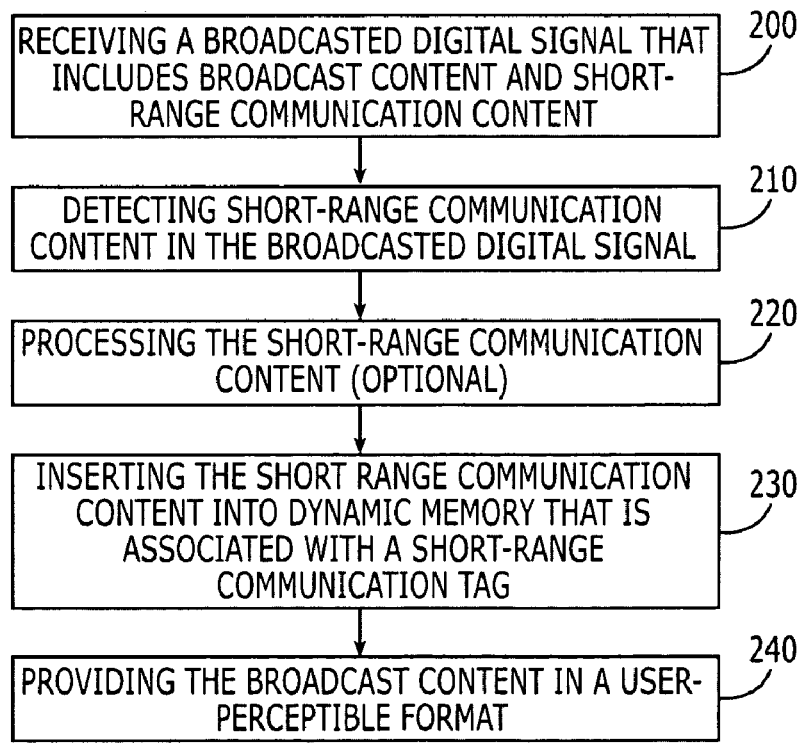

FIG. 6 is a flow diagram of a method for providing a user access to short-range communication content in combination with access to broadcast content, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods, systems, devices and computer program products for providing user-access to broadcast content in combination with user access to short-range communication content, such as RFID tag content or the like. A broadcast medium, such as Radio Data Broadcast, that provides for broadcast frequency transmission in unison with other content being carried on alternative frequencies is used to transmit digital broadcast signals that include both broadcast content and short-range communication content. A digital broadcast receiver that is equipped to receive the digital signals will additionally include a short-range communication transponder, such as an RFID tag or the like. The transponder, i.e., tag, will include dynamic updateable memory, such that as digital signals are received with new short-range communication content the information associated with the tag will be updated. The tag allows a reader device to capture and, in many instances, store the tag information for later use. Thus the invention allows the user of the reader device the ability to efficiently capture and store information without having to remember a URL (Universal resource Locator), a Short Message Service (SMS) message or the like. In addition, short-range communication provides for the user of the reading device to capture and store information without having to provide inputs, keypad entries or the like, to the capturing device.

Referring to FIG. 1, a block diagram of a broadcast network, a short-range communication network and a cellular network, collectively referred to as composite network 10 is shown, in accordance with an embodiment of the present invention. It is noted that while a cellular network is not an essential part of the present invention, it is shown in this figure to illustrate that the short-range communication reader device 12, which in this example is a cellular terminal, may be readily equipped to communicate via a cellular network in addition to the short-range communication medium. The cellular network may be required in those embodiments in which the short-range communication content includes a link to a network resource. In alternate embodiments (as shown in FIG. 3) the cellular network will be omitted. The composite network will typically include a plurality of terminals, although for the sake of clarity only one terminal is shown. As shown, the terminal will include an antenna 14 for transmitting and receiving both cellular network signals and short-range communication signals.

The cellular communication network includes a base site or base station (BS) 16. The base station is a part of a cellular network that includes elements required to operate the network, such as a mobile switching center (MSC) 18. As is known by those of ordinary skill in the art of telecommunications, the cellular network may also be referred to as a Base Station, Mobile Switching Center and Interworking function (BMI) 20. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 22 (Gateway).

The MSC 18 can be coupled to a network, such as a local area network (LAN), a metropolitan area network (MAN), and/or a wide area network (WAN). The MSC can be coupled to the network directly, or if the system includes a GTW 22 (as shown), the MSC can be coupled to the network via the GTW. In one configuration, for example, the MSC is coupled to the GTW, and the GTW is coupled to a WAN, such as the Internet 24. In turn, devices such as processing elements (e.g., personal computers, server computers or the like) can be coupled to the terminal 12 via the Internet. For example, the processing elements can include one or more processing elements associated with an origin server 26.

In addition to optional cellular network communication, the terminal 12 of the present invention will be equipped to communicate with other devices via short-range communication techniques. The short range communication techniques include, but are not limited to RFID, Bluetooth® (i.e., communication in the about 2.4 GHz frequency band), Infrared (IR), Wireless Local Area Network (WLAN), IrDA (Infrared Data Association), UWB (Ultra Wideband) or the like. In the FIG. 1 embodiment the terminal 12 is in short-rang communication communicates with transponder 28, i.e., tag and device 30 equipped with internal short-range transponder/tag 32 through a short-range interface. As will be appreciated, the electronic devices and tags can comprise any of a number of different known devices and tags capable of transmitting and/or receiving data in accordance with any of a number of different short-range communication techniques. Tag 28 illustrates a conventional tag that is known in the art, such as tag attached to a product or the like. The present invention is concerned with the tag 32, which is internally integrated into electronic device 30.

In the illustrated embodiment of FIG. 1 the electronic device 30 is equipped with a broadcast receiver; as such the device receives digital broadcast signals from transmitter 34. In this regard the device may be a television receiver, a radio receiver, a set-top box receiver or the like. In accordance with the invention, the transmitted digital signals will include both broadcast content and short-range communication content. The device 30 will detect the short-range communication content of the signal and insert the content into updateable memory that is associated with the short-range communication tag 32.

According to a preferred embodiment of the present invention, the broadcast content and the short-range communication content are associated with each other so that the short-range communication content provides additional information relating to currently received broadcast content. The short-range communication content may comprise, according to a non-limiting embodiment of the present invention, link information to a network source maintaining information relating to the broadcast content. The broadcast content, on the other hand, may include some kind of indication that is perceptible to a user of the receiving device that there is short-range communication content available. The indication may be either visual and/or audio indication according to embodiments of the present invention.

For a more detailed explanation of updateable memory in short-range communication transponders, such as RFID tags, see Patent Cooperation Treaty patent application PCT/IB04/000784, entitled "Continuous Data Provision By Radio Frequency Identification (RFID) Transponders", filed on 17 Mar. 2004, in the name of Nokia Corporation the same entity to which the current invention is assigned. The application discloses a RFID transponder for continuous data provision. A stream of data is received via a data interface and the received data is stored in tag memory. Then the stored data is read out from the memory and supplied to a RFID interface. Next, the memory, which is currently used for storing data, which has been read out previously, is provided for storing new data being received subsequently via the data interface. This application is herein incorporated by reference as if set forth fully herein.

FIG. 2 provides a more simplified block diagram of the system of the present invention, in accordance with an embodiment of the present invention. The FIG. 2 illustration eliminates the cellular network, which, as previously noted, is not material to the present invention. The system will include a broadcast transmission means 34, a broadcast receiver device 30 and a short-range communication reader device 12.

The broadcast transmission means 34 will typically broadcast radio and/or television frequency signals. In addition to broadcast content the signals that the broadcast transmission means transmit will include short-range communication content. The transmissions may rely of the Radio Data System standard, detailed earlier, to transmit FM radio or VHF television signals that include additional information transmitted at alternative frequencies. Alternatively, the transmission may rely on digital video broadcasting standards, such as, for example Digital Video Broadcasting (DVB) standards. Additionally, the invention may rely on other systems, currently known or known in the future, for transmitting broadcast content in combination with short-range communication content.

The broadcast receiver device 30 will include a broadcast receiver 40 and a short-range communication tag 42 that includes a dynamic and updateable memory 44. The updateable memory allows for short-range communication content associated with the tag to be updated based on the broadcast content that is received. Further details related to the broadcast receiver device are explained in relation to FIG. 3.

The short-range communication reader 12 will be capable of reading and, in most instances, storing the contents of the tag 42 when the reader comes within the predefined transmission range of the broadcast receiver device 30. The reader device may be optionally configured with logic (not shown in FIG. 2) that allows the user of the device to predefine which short-range communication content will be delivered to the reader device.

FIG. 3 provides a block diagram of a short-range communication tag 42 that includes dynamic and updateable memory 44. The tag will include a broadcast receiver interface 60 for receiving short-range communication content from the receiver. The broadcast receiver will be in communication with a processor 70 that is in communication with memory 44. The processor is responsible for updating the short-range communication content that is stored in the memory and is responsible for providing access to the data by the associated short-range communication readers. As such, the processor will be in communication with the wireless short-range communication interface 80 that transmits the short-range communication wirelessly. In one specific example the short-range communication tag of the present invention is a passive RFID tag. The passive tag is beneficial, in that, it does not consume power, which saves a considerable amount of energy for the broadcast receiver. Savings in power can especially be of benefit if the broadcast receiver is a portable device relying on battery power. In addition, since a majority of the short-range content will be accessed by a user, the passive device is preferred over a non-passive tag/module, such as a Bluetooth® module, that requires energy at all time.

In one specific embodiment of the invention, the system is implemented such that the receiver device 30 is a radio transmission receiver that is physically embodied in an automotive vehicle. The transmission means 34 will communicate transmissions, such as RDS transmissions that include radio broadcast content and short-range communication content. The receiver device will broadcast the radio content and will provide the short-range communication content to the integrated tag. If the driver or a passenger of the vehicle desires further information about the radio content, for example further information concerning a song or program or further information regarding an advertised product or service, the driver or passenger will direct a reading device 12, such as a mobile communication terminal, a PDA or the like at the receiver, such that the information is automatically captured and stored by the reading device.

In yet another specific embodiment of the invention, the system is implemented such that the receiver device 30 is a television receiver. The transmission means 34 will communicate transmission such as VHF transmissions or the like that include television broadcast signals and short-range communication signals. The receiver device will broadcast the television content and will provide the short-range communication content to the integrated tag, typically an RFID tag. If television viewer desires further information about the television content, for example further information concerning a televised program or further information regarding a product or service advertised in a commercial, the viewer will direct a reading device 12, such as remote control device or the like at the receiver, such that the information is automatically captured, displayed and/or stored by the reading device.

FIG. 4 provides a block diagram of a receiver apparatus 30 that provides receipt of broadcast signals and provides user-access to short-range communication content includes in the broadcast signals, in accordance with an embodiment of the present invention. The receiver device 30 will include a broadcast receiver 40 that receives the broadcast signal. Additionally, the device will include detector logic 50 that is in communication with the receiver and provides detection of short-range communication content in the received broadcast signal. The detector logic may be configured as software or hardware. In software implementations the logic will executed by a processor 60. The device may additionally include processing logic 52 that is responsible for converting or re-formatting the short-range communication content into data suitable for short-range communication. In certain embodiments conversion or re-formatting may not be required. Additionally, the device will typically include inserter logic 54 that is responsible for inserting the short-range communication content into the updateable memory 44 of the tag 42.

In embodiments in which the receiver device receives signals that include short-range communication content that has a volume that exceeds the limits of the tag memory, parser logic (not shown in FIG. 3) may be required to parse the content into two or more portions. The portions that do not immediately go into the tag memory are typically stored in temporary buffer memory (not shown in FIG. 3) prior to be provided to the tag memory.

FIG. 5 provides a flow diagram of a method for providing short-range communication content in combination with broadcast content. At step 100, the method provides for broadcasting a digital signal that includes broadcast content and short-range communication content. As previously noted the broadcast content may be video content, audio content or the like and the short-range communication content may include RFID, IR, IrDA, WLAN, Bluetooth® or the like. RDS or some other communication technique that provides for broadcast content to be communication in the same transmission as other information may be used to transmit the signal. In most embodiments the short-range communication content will be related to the broadcast content such that when the broadcast content is presented associated short-range communication content will be available.

At step 110, the method provides for receiving the signal at a broadcast receiver apparatus equipped with an integrated programmable (i.e., updateable) short-range communication tag and, at step 120, the short-range communication content is provided to the updateable memory associated with the short-range communication tag. Optional sub-steps (not shown in FIG. 4) may precede the step of providing the short-range communication content to the updateable memory. These sub steps include, but are not limited to, detecting the short-range communication content of the received digital signal, and converting the short-range communication content of the received digital signal to data suitable for short-range communication. In addition if the volume of the short-range communication content in the signal exceeds the limits of the updateable memory, the method may include the steps of parsing the short-range communication content into two or more portions and inserting one or more of the parsed portions into temporary buffer memory.

At step 130, the method includes the step of reading the short-range communication content via a reader apparatus that is proximate the broadcast receiver apparatus. Optionally, the reader apparatus may be preconfigured to read only those contents of the tag that are of interest to the user of the reader.

FIG. 6, provides a flow diagram of an optional method for providing a user access to short-range communication content in combination with access to broadcast content. At step 200, the method includes the step of receiving a broadcasted digital signal that includes broadcast content and short-range communication content. As previously noted the broadcast content may be video content, audio content or the like and the short-range communication content may include RFID, IR, IrDA, WLAN, Bluetooth® or the like. RDS or some other communication technique that provides for broadcast content to be communication in the same transmission as other information may be used to transmit the signal. In most embodiments the short-range communication content will be related to the broadcast content such that when the broadcast content is presented associated short-range communication content will be available.

At step 210, the method includes the step detecting the short-range communication content in the broadcasted digital signal. Optionally, at step 220, the method includes the step of processing the short-range communication content to convert or reformat the content if the content is not in form suitable for short-range communication.

At step 230, the method includes the step of inserting the short-range communication content into updateable memory associated with a short-range communication tag. While the method is preparing the short-range communication content for inclusion in the memory associated with the tag, at step 240, the broadcast content is provided in user-perceptible format, such as audio and/or video format.

It will be understood that each block or step of the flowcharts in FIGS. 4 and 5, and combinations of blocks in the flowchart, can be implemented by computer program instructions. These computer program instructions may be loaded onto a computer or other programmable apparatus, such as the processor 60 of the apparatus 30 or the, to produce a machine, such that the instructions which execute on the computer or other programmable apparatus create means for implementing the functions specified in the flowchart block(s) or step(s). These computer program instructions may also be stored in a computer-readable memory of the receiver apparatus that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the present invention provides systems, devices and methods for providing user access to broadcast content in combination with user access to short-range communication content, such as RFID tag content or the like. Thus the invention allows the user of the reader device the ability to efficiently capture and store information without having to remember a URL (Universal resource Locator), a Short Message Service (SMS) message or the like. In addition, short-range communication provides for the user of the reading device to capture and store information without having to provide inputs, keypad entries or the like, to the capturing device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
a digital broadcast receiver configured to receive a broadcasted digital signal, and to output broadcast content of the broadcasted digital signal;
a processor operatively coupled with the digital broadcast receiver, and configured to:
detect short-range communication content in the received broadcasted digital signal, the short range communication content comprising additional information that is related to the outputted broadcast content;
convert the detected short-range communication content in the received broadcast signal into a format suitable for short-range communication; and
insert the converted short-range communication content into an updateable memory; and
a short-range communication tag coupled with the updateable memory, the short-range communication tag configured to transmit at least a portion of the inserted short-range communication content of the updateable memory to a reader device requesting said short-range communication content
wherein the short-range communication tag comprises a Radio Frequency Identification (RFID) tag, and wherein the processor is further configured to include a user perceptible indication to the outputted broadcast content when said short-range communication content relating to the outputted broadcast content is available on the updateable memory.

2. The apparatus of claim 1, wherein the apparatus is further defined as chosen from the group of apparatuses consisting of a home appliance, an industrial appliance, a television and a radio.

3. The apparatus of claim 1, further comprising parser logic that parses the detected short-range communication content into two or more portions suitable for insertion in the updateable memory.

4. The apparatus of claim 1, further comprising a buffer memory in communication with the short-range communication tag, wherein the buffer memory temporarily stores the short-range communication content prior to storage in the updateable memory.

5. The apparatus of claim 1, wherein the short-range communication is chosen from the group of communications consisting of Radio Frequency Identification (RFID) communication, Infrared (IR) communication, Wireless Local Area Network (WLAN) communication and communication in the about 2.4 GHz frequency band.

6. The apparatus of claim 1, wherein the digital broadcast receiver receives one or more broadcasted digital signals and wherein the updateable memory updates the short-range communication content in relation to information in a respective one of the one or more broadcasted digital signals.

7. The apparatus of claim 1, wherein the digital broadcast receiver receives one or more digital broadcast signals, the one or more digital broadcast signals comprising a respective one of one or more short-range communication content, the detected short-range communication content is updated or revised in the updateable memory, based on information in the one or more short-range communication content.

8. The apparatus of claim 1, wherein the short-range communication content comprises radio frequency identification data (RFID).

9. The apparatus of claim 1, wherein the short-range communication tag comprises a transponder.

10. The apparatus of claim 1, wherein the RFID tag comprises a passive RFID tag that substantially consumes zero power.

11. The apparatus of claim 1, wherein the broadcasted digital signal comprises audio or video data and the short-range communication content is related to the audio or video data.

12. A system comprising:
a digital receiver apparatus configured to receive broadcasted digital signals comprising broadcast content and short-range communication content, the receiver apparatus configured to output the broadcast content;
a processor operatively coupled with the digital broadcast receiver, and configured to:
    detect the short-range communication content in the received broadcasted digital signals, the short-range communication content comprising additional information that is related to the outputted broadcast content;
    convert the detected short-range communication content in the received broadcast signal into a format suitable for short-range communication; and
    insert the converted short-range communication content into an updateable memory; and
a short-range communication reader apparatus configured to read at least a portion of the inserted short-range communication content from the updateable memory of a short-range communication tag when the reader is within a predefined range of the digital receiver apparatus,
wherein the short-range communication tag comprises a Radio Frequency Identification (RFID) tag, and wherein the processor is further configured to include a user perceptible indication to the outputted broadcast content when said short-range communication content relating to the outputted broadcast content is available on the updateable memory.

13. The system of claim 12, further comprising a broadcasting device chosen from the group consisting of an audio broadcasting means and a video broadcasting means.

14. The system of claim 12, wherein the digital receiver apparatus further comprises parsing logic for parsing the short-range communication content into two or more portions.

15. The system of claim 12, wherein the digital receiver apparatus further comprises a buffer memory for temporarily storing the short-range communication content prior to storage in the updateable memory.

16. The system of claim 12, wherein the short-range communication reader apparatus is further defined as a portable apparatus.

17. The system of claim 12, wherein the short-range communication reader apparatus is further defined as chosen from the group of apparatuses consisting of a cellular telephone, a remote control, and a personal digital assistant (PDA).

18. The system of claim 12, further comprising broadcasting means for receiving one or more broadcasting digital signals, the one or more broadcasting digital signals comprising a respective one of one or more short-range communication content, the short-range communication content is updated or revised in the updateable memory, based on information in the one or more short-range communication content.

19. The system of claim 12, wherein the RFID tag comprises a passive RFID tag that substantially consumes zero power.

20. The system of claim 12, wherein the broadcast digital signals comprise audio or video data and the short-range communication content is related to the audio or video data.

21. A short-range communication tag device, comprising:
a broadcast receiver interface configured to communicate with a broadcast receiver that receives one or more broadcast digital signals, and outputs broadcast content and short-range communication content of the broadcasted digital signal, the broadcast receiver interface configured to receive the short-range communication content from the broadcast receiver;
a processor operatively coupled with the broadcast receiver interface, and configured to:
    communicate with the broadcast receiver interface;
    detect the short-range communication content in the received broadcast digital signals, the short-range communication content comprising additional information that is related to the outputted broadcast content;
    convert the detected short-range communication content in the received broadcast digital signals into a format suitable for short-range communication; and
    insert the converted short-range communication content into an updateable memory; and
a wireless short-range communication interface in communication with the processor configured to transmit at least a portion of the inserted short-range communication content of the updateable memory to a reader device requesting said short-range communication content,
wherein the tag device comprises a Radio Frequency Identification (RFID) tag, and wherein the processor is further configured to include a user perceptible indication to the outputted broadcast content when said short-range communication content relating to the outputted broadcast content is available on the updateable memory.

22. The device of claim 21, wherein the broadcast receiver receives one or more digital broadcast signals, the one or more digital broadcast signals comprising a respective one of a one or more short-range communication content, the short-range communication content is updated or revised, based on information in the one or more short-range communication content.

23. The device of claim 21, wherein the RFID tag comprises a passive RFID tag that substantially consumes zero power.

24. The device of claim 21, wherein the broadcast content comprises audio or video data and the short-range communication content is related to the audio or video data.

25. A method comprising:
receiving a signal comprising broadcast content and short-range communication content at a broadcast receiver apparatus equipped with an integrated programmable short-range communication tag;

outputting the broadcast content via the broadcast receiver apparatus;

detecting, via a processor, the short-range communication content in the received signal, the short-range communication content comprising additional information that is related to the outputted broadcast content;

converting the detected short-range communication content in the received signal into a format suitable for short-range communication;

inserting the converted short-range communication content into an updateable memory;

reading at least a portion of the inserted short-range communication content of the updateable memory via a reader apparatus requesting said short-range communication content, the reader apparatus is proximate the broadcast receiver apparatus, wherein the short-range communication tag comprises a Radio Frequency Identification (RFID) tag; and including, via the processor, a user perceptible indication to the outputted broadcast content when said short-range communication content relating to the outputted broadcast content is available on the updateable memory.

26. The method of claim 25, further comprising, parsing the short-range communication content of the received digital signal into two or more portions.

27. The method of claim 26, further comprising, inserting one or more of the portions into a temporary buffer memory unit prior providing the one or more portions to the updateable memory unit associated with the programmable short-range communication tag.

28. The method of claim 25, further comprising broadcasting a digital signal that includes the broadcast content and the short-range communication content with the short-range communication content being defined to be related to the broadcast content.

29. The method of claim 25, further comprising broadcasting a digital signal that includes the broadcast content and the short-range communication content with the short-range communication content being chosen from the group of short-range communications consisting of Radio Frequency Identification (RFID) communication, Infrared (IR) communication, Wireless Local Area Network (WLAN) communication and communication in the about 2.4 GHz frequency band.

30. The method of claim 25, further comprising receiving one or more broadcast digital signals and updating or revising the short-range communication content provided to the updateable memory in relation to information in a respective one of the one or more broadcast digital signals.

31. The method of claim 25, further comprising:

receiving one or more digital broadcast signals, the one or more digital broadcast signals comprising a respective one of one or more short-range communication content; and updating or revising the short-range communication content provided to the updateable memory based on information in the one or more short-range communication content.

32. The method of claim 25, wherein the short-range communication tag comprises the updateable memory.

33. The method of claim 25, wherein the short-range communication content comprises radio frequency identification data (RFID).

34. The method of claim 25, wherein the short-range communication tag comprises a transponder.

35. The method of claim 25, wherein the RFID tag comprises a passive RFID tag that substantially consumes zero power.

36. The method of claim 25, wherein the digital signal comprises audio or video data and the short-range communication content is related to the audio or video data.

37. A method comprising:

receiving a broadcasted digital signal that comprises broadcast content and short-range communication content;

outputting the received broadcast content;

detecting, via a processor, the short-range communication content in the broadcasted digital signal, the short-range communication content comprises additional information that is related to the outputted broadcast content;

converting the detected short-range communication content in the received signal into a format suitable for short-range communication;

inserting the converted short-range communication content into an updateable memory;

transmitting at least a portion of the inserted short-range communication content of the updateable memory to a reader device requesting said short-range communication content, wherein the short-range communication tag comprises a Radio Frequency Identification (RFID) tag; and including, via the processor, a user perceptible indication to the outputted broadcast content when the short-range communication content relating to the outputted broadcast content is available on the updateable memory.

38. The method of claim 37, wherein receiving a broadcasted digital signal that includes broadcast content and short-range communication content further defines the short-range communication content as related to the broadcast content.

39. The method of claim 37, further comprising, parsing the short-range communication content into two or more portions.

40. The method of claim 37, further comprising, inserting one or more of the portions into a temporary memory buffer prior to inserting the one or more portions into the updateable memory associated with a short-range communication tag.

41. The method of claim 37, further comprising:

receiving one or more broadcasted digital signals, the one or more broadcasted digital signals comprising a respective one of one or more short-range communication content; and updating or revising the short-range communication content inserted in the updateable memory based on information in the one or more short-range communication content.

42. The method of claim 37, wherein the RFID tag comprises a passive RFID tag that does not substantially consume power.

43. The method of claim 37, wherein the broadcasted digital signal comprises audio or video data and the short-range communication content is related to the audio or video data.

44. A computer program product, the computer program product comprising a computer-readable storage medium having computer-readable program code portions stored therein, the computer-readable program code portions comprising:

a first executable portion for detecting short-range communication content in a digital broadcast signal; and a second executable portion for causing broadcast content of the digital broadcast signal to be output, the short-range communication content comprising additional information that is related to the outputted broadcast content;

a third executable portion for converting the detected short-range communication content in the digital broadcast signal into a format suitable for short-range communication;

a fourth executable portion for inserting the converted short-range communication content into an updateable memory;

a fifth executable portion for causing at least a portion of the short-range communication content of the updateable memory to be transmitted to a reader device requesting said short-range communication content, wherein a short-range communication tag coupled with the updateable memory comprises a Radio Frequency Identification (RFID) tag; and a sixth executable portion for including a user perceptible indication to the outputted broadcast content when the short-range communication content relating to the outputted broadcast content is available on the updateable memory.

45. The computer program product of claim 44, further comprising a seventh executable portion for parsing the short-range communication content into two or more portions.

46. The computer program product of claim 45, further comprising an eighth executable portion for inserting one or more of the portions into a temporary storage buffer prior to inserting the one or more portions into the updateable memory.

47. The computer program product of claim 44, further comprising:

a seventh executable portion capable of receiving one or more digital broadcast signals, the one or more digital broadcast signals comprising a respective one of one or more short-range communication content;

an eighth executable portion capable of updating or revising the short-range communication content inserted in the updateable memory, based on information in the one or more short-range communication content.

48. The computer program product of claim 44, wherein the RFID tag comprises a passive RFID tag that does not substantially consume power.

49. The computer program product of claim 44, wherein the digital broadcast signal comprises audio or video data and the short-range communication content is related to the audio or video data.

50. An apparatus comprising a processor configured to:

in response to receipt of a broadcasted digital signal that comprises broadcast content and short-range communication content, cause the broadcast content to be output; and detect the short-range communication content in the broadcasted digital signal, the short-range communication content comprising additional information that is related to the outputted broadcast content;

convert the detected short-range communication content in the broadcasted digital signal into a format suitable for short-range communication;

insert the converted short-range communication content into an updateable memory that is coupled with a short-range communication tag;

cause at least a portion of the inserted short-range communication content of the updateable memory to be transmitted to a reader device requesting said short-range communication content, wherein the short-range communication tag comprises a Radio Frequency Identification (RFID) tag; and include a user perceptible indication to the outputted broadcast content when the short-range communication content relating to the outputted broadcast content is available on the updateable memory.

51. The apparatus of claim 50, wherein the RFID tag comprises a passive RFID tag that does not substantially consume power.

52. The apparatus of claim 50, wherein the processor is further configured to:

receive one or more broadcasted digital signals and the updateable memory is configured to update the short-range communication content in relation to information in a respective one of the one or more broadcasted digital signals.

53. The apparatus of claim 50, wherein the broadcasted digital signal comprises audio or video data and the short-range communication content is related to the audio or video data.

* * * * *